United States Patent [19]

Guigan

[11] 4,247,017
[45] Jan. 27, 1981

[54] AUTOMATIC DISPENSING MACHINE FOR DISPENSING STACKED OBJECTS

[76] Inventor: Jean Guigan, 9, rue Jean Mermoz, 75008 Paris, France

[21] Appl. No.: 74,372

[22] Filed: Sep. 10, 1979

[30] Foreign Application Priority Data

Sep. 22, 1978 [FR] France .............................. 78 27189

[51] Int. Cl.³ ........................................... B65G 59/06
[52] U.S. Cl. .................................... 221/227; 221/278
[58] Field of Search ............... 221/200, 259, 260, 251, 221/227, 232, 226, 203, 201, 298, 301, 299, 150 R, 278

[56] References Cited

FOREIGN PATENT DOCUMENTS 1591038  5/1970  France .

*Primary Examiner*—Stanley H. Tollberg
*Attorney, Agent, or Firm*—Sughrue, Rothwell, Mion, Zinn and Macpeak

[57] ABSTRACT

An automatic dispensing machine dispenses stacked objects when a box (2) at the bottom of a vertical stack (4) is ejected forwards by a cam wheel (20) when inflatable bladders (12) which raise the stack are deflated and thus allow contact between the box and an arc of the wheel. The machine could be used to dispense medicine in parallelepipedical boxes.

5 Claims, 2 Drawing Figures

AUTOMATIC DISPENSING MACHINE FOR DISPENSING STACKED OBJECTS

The present invention relates to an automatic dispensing machine for dispensing stacked objects.

BACKGROUND

Known automatic dispensing machines, e.g. for dispensing sheets of paper, include:

guide means for guiding a stack of objects to be dispensed, a drive wheel which rotates on an axle and is disposed facing one end of the stack so as to be able to come into contact with the object situated at the bottom or end of the stack, means being provided to move the stack towards the wheel, a motor for rotating the wheel, and a controlled spacer device which can be in either one of two states, one of which is an active state in which the stack is moved away from the drive wheel so as to prevent contact between the drive wheel and said object situated at the bottom or end of the stack, and the other of which is a passive state in which the drive wheel can be brought into contact with the object so that the drive wheel drives the object out of the stack.

The stack is often vertical and the drive wheel is disposed above the stack on which it is pressed by automatic control means. Such dispensing machines are perfectly suited to high-speed dispensing of sheets of paper which are always identical to feed a copying machine, but they are relatively expensive, in particular because it is necessary to shift the rotation axle of the drive wheel downwards. Also, French patent application No. 2 117 742 filed on December 15, 1971, for "A machine for dispensing objects at the outlet of a dynamic stock", describes a dispensing machine for dispensing relatively thick and rigid objects such as parallelepipedic boxes. In this dispensing machine, the object situated at the bottom of an inclined stack is raised perpendicularly to the axis of the stack, by an inflatable bladder whenever required, to make it pass beyond a fixed stop at the bottom of the stack. It is then desirable to dispose the greatest length of the object along the axis of the stack and hence to have a very long stack, the dispensing machine then being too bulky to be placed in premises which are accessible to the public.

The present invention aims to provide an automatic dispensing machine for dispensing stacked objects which is particularly simple to manufacture and operate and is applicable in particular to dispensing medicine in parallelepipedical boxes.

THE INVENTION

It provides an automatic dispensing machine for dispensing stacked objects, said machine including:

guide means for guiding a stack of objects to be dispensed, an ejector device which rotates on an axle and is disposed facing one end of the stack so as to be able to come into contact with the object situated at the bottom or end of the stack, means for moving the stack towards the ejector device, a motor for rotating the ejector device, and a controlled spacer device which can be in either one of two states, one of which is an active state in which the stack is moved away from the ejector device so as to prevent contact between the ejector device and said object situated at the bottom or end of the stack and the other of which is a passive state in which the ejector device can come into contact with the object so that the ejector device drives the object out of the stack, characterized in that the ejector device is constituted by an ejector cam with an active arc situated at a greater distance from the axis of rotation than a passive zone formed by the remainder of the periphery, a stop being provided to limit the movement of the stack towards the ejector cam when the spacer device is in its passive state, so as to prevent contact between said object at the bottom or end of the stack and said passive zone while allowing contact between the object and the active arc, and said spacer device being provided with an inhibition device synchronized with the rotation of the ejector cam so as to prevent it from changing state when the active arc is in contact with said object at the bottom or end of the stack.

DRAWINGS

An embodiment of a dispensing machine in accordance with the invention is described hereinbelow with reference to the accompanying drawings. When the same component is illustrated in both figures, it bears the same reference symbol in each of them.

DESCRIPTION

Figure 1:
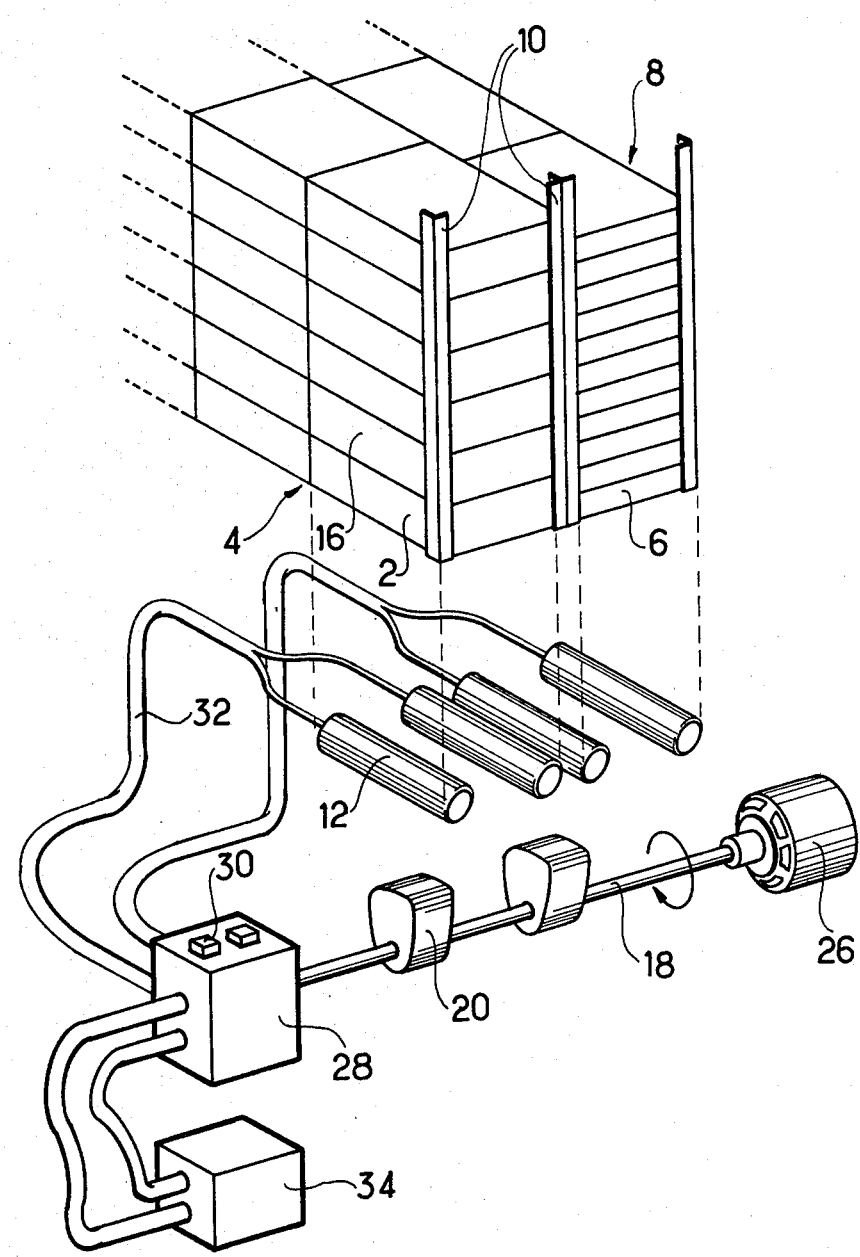
FIG. 1 is a perspective view of the dispensing machine.
Figure 2:
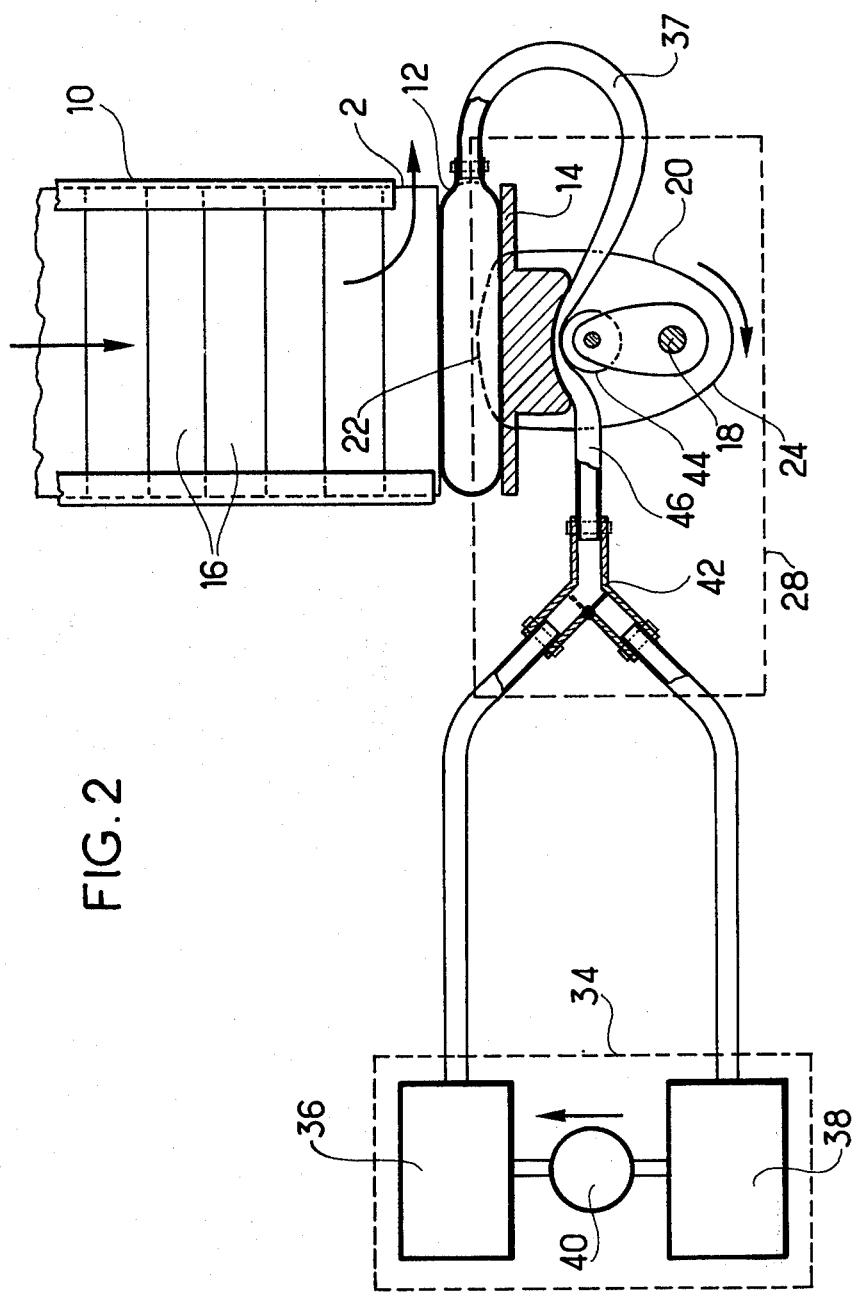
FIG. 2 is a cross-section view of the same dispensing machine.

The dispensing machine includes two vertical stacks of parallelepipedical boxes. The boxes such as 2 in stack 4 are identical in size and content.

The boxes, such as 6 in stack 8, are also identical to one another, but they differ from the boxes of the stack 4 both in their contents and in their height.

Each of these stacks is provided with the same mechanical means which will be described for stack 4 alone. The stack 4 vertically guided by slide rails or guide means 10 and is supported by two deformable side chambers such as inflatable bladders 12 which are disposed on a support plate 14 and under the boxes such as 2 situated at the bottom of the stack. These chambers constitute a spacer device which, when it is active, i.e. when the bladders are inflated, sets the stack 4 and the box 2 in a raised position such that the bottom of the slide rail 10 prevents the box 2 from moving forward. When these bladders are passive, i.e. when they are deflated, the box 2 can move forwards, but box 16 situated immediately above cannot do so.

An ejector device 20 in the form of a cam is disposed under the stack. The ejector device includes an active arc 22 coated with a substance which has a high friction coefficient, e.g. ribbed rubber. The active arc protrudes, i.e. it is situated at a greater distance from the axle 18 of the cam than the rest of the periphery of the cam, which constitutes a passive zone 24. The axle is horizontal and transversal and it is driven by a motor 26 to rotate the cam continuously.

The active arc 22 passes beneath the lower box 2 without touching it when the bladders 12 are inflated. When they are deflated, the passive zone still cannot touch the box, but the active arc comes into contact therewith when it is upwardly directed and it ejects the box forward by friction so as to allow a purchaser or user to take the box. Of course, the cam 20 can comprise either one or several active arcs. However, it is important for these arcs to be separated by passive zones each of which allows the stack of boxes to move doswnwards again between the passes of two successive active arcs or between two successive passes of the single active arc.

It is also useful for the change in state of the spacer device to take place completely between two such successive passes. That is why the space device is provided with an inhibition device which is synchronized with the rotation of the axle 18 and which prevents the change in state when the active arc 22 is in contact with the box 2. The control device is often constituted by electronic circuits of the microprocessor type. However, only a mechanical embodiment will be described, but it will be understood by the person skilled in the art that its functions can readily be performed by electronic means.

The inhibition device is constituted by a cam 44 which rotates on the axle 18 and at least partially flattens a flexible pipe 46 as long as the active arc 22 is in a position in which it can contact the box 2, the flexible pipe connecting a valve 42 to a pipe 32.

The control and inhibition devices are contained in a casing 28 in which one end of the axle 18 is inserted and which has as many control buttons such as 30 as there are stacks such as 4. The casing supplies the bladders 12 with oil under pressure to inflate them and removes the oil to deflate them, the oil passing through the pipes 32. It is itself supplied with oil under pressure by a pressurized fluid source 34 which includes a high pressure oil tank 36, a low pressure oil tank 38 and a compressor 40 which supplies the tank 36 from the tank 38. Oil is transmitted from the tank 36 to the pipe 32 or from the pipe 32 to the tank 38 via a two-way valve 42 disposed in the casing 28 and controlled by the button 30.

Number-limiting means, not shown, can advantageously be disposed between the button 30 and the valve 42, from the operational point of view, so as to inflate the bladders 12 again as soon as the required number of boxes has been dispensed. Therefore, careless users cannot receive more boxes than they require.

The invention is not limited to the embodiment described hereinabove. The dispensing machine described by the invention can be used for a horizontal stack in which the objects are not moved towards the end of the stack by gravity, but by suitable mechanical means.

It is claimed:

1. An automatic dispensing machine for dispensing stacked objects, said machine including:
    guide means for guiding a stack of objects to be dispensed,
    an ejector device which rotates on an axle and is disposed facing one end of the stack so as to be able to come into contact with the object situated at the bottom or end of the stack,
    means for moving the stack towards the ejector device,
    a motor for rotating the ejector device, and
    a controlled spacer device which can be in either one of two states, one of which is an active state in which the stack is moved away from the ejector device so as to prevent contact between the ejector device and said object situated at the bottom or end of the stack and the other of which is a passive state in which the ejector device can come into contact with the object so that the ejector device drives the object out of the stack,
    characterized in that the ejector device is constituted by an ejector cam with an active arc situated at a greater distance from the axis of rotation than a passive zone formed by the remainder of the periphery,
    a stop being provided to limit the movement of the stack towards the ejector cam when the spacer device is in its passive state, so as to prevent contact between said object at the bottom or end of the stack and said passive zone while allowing contact between the object and the active arc, and
    said spacer device being provided with an inhibition device synchronized with the rotation of the ejector cam so as to prevent it from changing state when the active arc is in contact with said object at the bottom or end of the stack.

2. A dispensing machine according to claim 1, wherein said spacer device includes at least one deformable chamber disposed between a support plate and said object at the bottom or end of the stack,
    a pressurized fluid source,
    a pipe for bringing the fluid from said source to said chamber so as to inflate it and to move the stack away from the ejector cam, and
    a control device to make the pipe communicate with either the source, thus putting the spacer means in their active state, or a low-pressure zone, thus allowing the fluid to escape from the deformable chamber and putting the spacer means in their passive state.

3. A dispensing machine according to claim 2, wherein said deformable chamber is constituted by inflatable bladders.

4. A dispensing machine according to claim 1, wherein guide means are disposed vertically so that the stack is moved by gravity towards the ejector cam.

5. A dispensing machine according to claim 1 including:
    guide means for several parallel stacks,
    several ejector cams disposed on the same rotation axle, each of the cams being disposed facing one end of the stacks, and
    several spacer devices, each coming into operation on one of these stacks and each provided with an individual control means.

* * * * *